May 12, 1959 C. I. SMITH ET AL 2,886,705

WIDEBAND MICROWAVE DISCRIMINATOR

Filed Feb. 25, 1958 2 Sheets-Sheet 1

May 12, 1959 C. I. SMITH ET AL 2,886,705
WIDEBAND MICROWAVE DISCRIMINATOR
Filed Feb. 25, 1958 2 Sheets-Sheet 2

INVENTORS
CHARLES I. SMITH
MACK M. ZIMET
HERBERT L. ROBINSON
BY Victor D. Borst
ATTORNEY United States Patent Office 2,886,705

Patented May 12, 1959

2,886,705

WIDEBAND MICROWAVE DISCRIMINATOR

Charles I. Smith, Kew Gardens, Mack M. Zimet, Brooklyn, and Herbert L. Robinson, Jamaica, N.Y., assignors to Sperry Rand Corporation, Ford Instrument Company Division, Long Island City, N.Y., a corporation of Delaware Application February 25, 1958, Serial No. 717,484

2 Claims. (Cl. 250—31)

This invention relates to a microwave device which employs standard microwave components and serves to process radar frequencies by controlling power and phase.

In general, the invention comprises a wave guide device which is adapted to receive radar frequencies over wide band range and yield voltages the amplitudes of which are governed by the departure of the input frequency from that of a predetermined frequency at the center of the band width. The device provides means for tuning to some preselected center frequency which serves as a standard for the frequencies expected to be used in its operation, the amplitude and polarity of the voltage output being determined by the change in frequency from this standard. More specifically, the device comprises the usual microwave components, together with detector elements for converting the microwave energy to electric current. The device functions initially to divide the power of the incoming radar signal and shifts one portion of the divided signal in phase by 90°. A shorted length of transmission line serves as a variable phase shifter, and a balanced detector is provided to convert the radar signals to direct current. The three member components are basically couplers which may be of the broad wall or short slot hybrid type. The first component which is the power splitter and 90° phase shifter is preferably a short slot hybrid coupler but may be replaced by a simple T section of a wave guide and the third element which serves basically to combine the divided signals is also preferably a short slot hybrid coupler having crystal detector elements but this coupler could be replaced by a magic T type of balanced detector or a ratrace detector. A more detailed description of the invention may be gained by reading the following description which is taken in conjunction with the accompanying drawings in which—

Figures 1, 1A, 2:
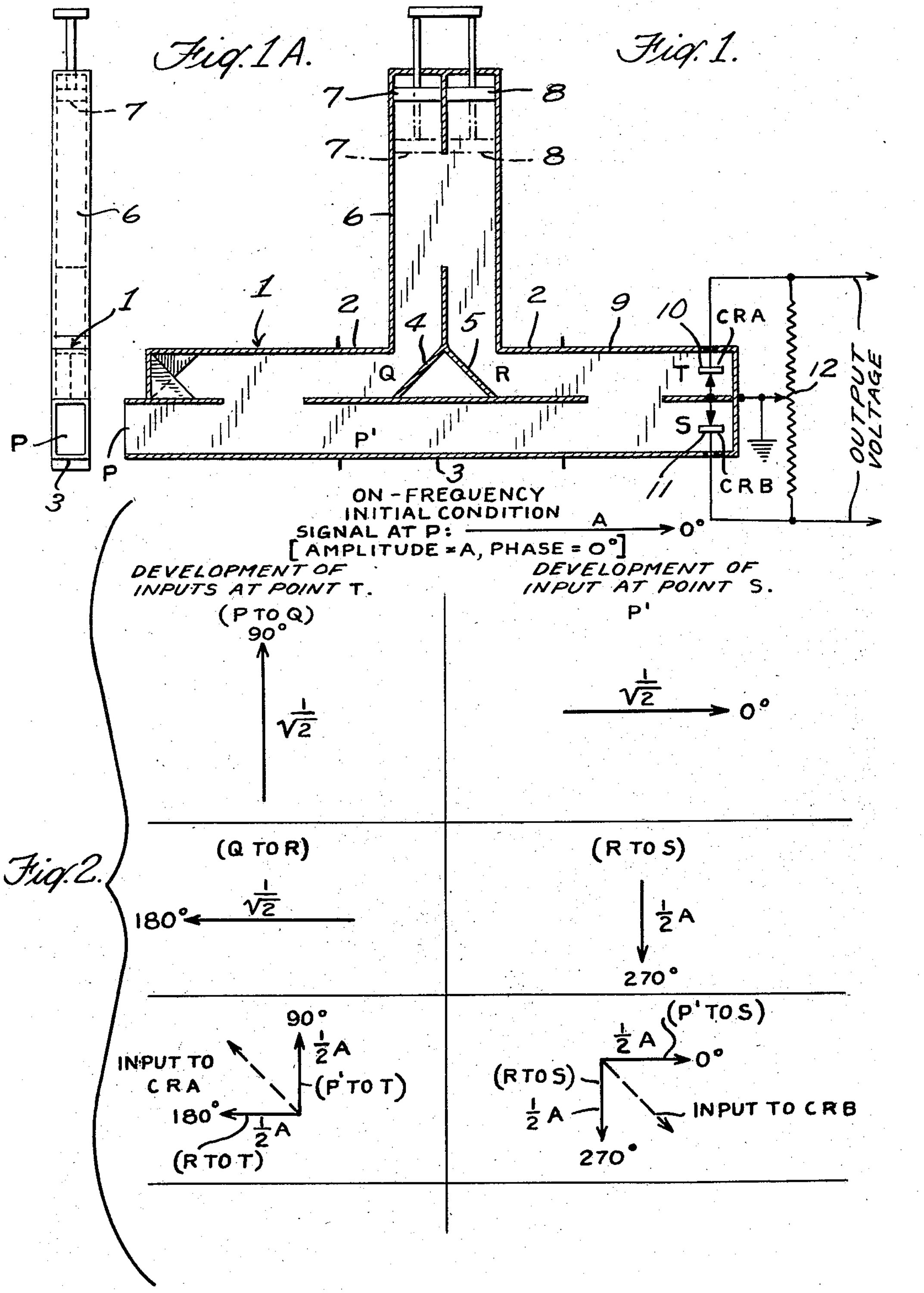
Fig. 1 is an elevation in section of the microwave discriminator.
Fig. 1A is an end view of the microwave discriminator.
Fig. 2 is a vector diagram showing the phase of the divided signals on each of the detector elements when the standard frequency is employed.

As shown in Fig. 1, a short slot hybrid coupled 1 is provided to receive a signal in one of its input arms, the other arm being terminated to absorb reflections. The open end of the input arm is adapted to receive microwave energy at point P. The output arms of the hybrid coupler 1 communicate with two equal length wave guides or pieces of transmission line 2 and 3. The top piece 2 of the transmission line is broken in the middle, the break consisting of two elbow sections 4 and 5 placed back to back thus providing two wave reflectors in the transmission line. One of these inputs feeds into a short slot coupler 6 which is terminated by two ganged shorting plungers 7 and 8. The points of microwave travel at the entrance and the output of the short slot coupler 6 are designated Q and R, respectively, while P′ designates the entrance point in the bottom wave guide 3. The output arms of the broken and unbroken pieces 2 and 3, respectively, of the transmission line communicate with the input of a balanced detector which comprises a short slot coupler 9 having matched crystals, CRA and CRB in its output arms. The two crystals are connected together through a potentiometer 12 having a wiper which can be adjusted so as to terminate the crystals properly over the range of microwave frequencies for which the invention is to operate. The points T and S, at crystals CRA and CRB, respectively, designate output points in the path of microwave travel through the device.

It is apparent that two signals are received by each of the crystals, the phase and amplitude of their components is illustrated in Fig. 2. For example, one of the signals appearing at point T will have traveled from the open end of the hybrid coupler 1 to point Q during which it will have lost half its power and will have been shifted in phase by 90°. This signal will then travel through the coupler 6 from Q to R during which it will be shifted in phase by another 90° and appear at point T again losing half of its power between R and T as a consequence of energy from point R traveling to point S. The second component signal at point T will shift in phase only 90° since no phase shift will occur between points P and P′ and will lose three-quarters of its power due to the transmission through the hybrid couplers 1 and 9. As shown in Fig. 2, the two corresponding signals appearing at point S to be picked up by the crystal CRB will be phase shifted 180° to each other with the result that the resultant signal at each crystal will be opposite and equal and together will produce zero output voltage across the potentiometer 12.

Figure 3A:
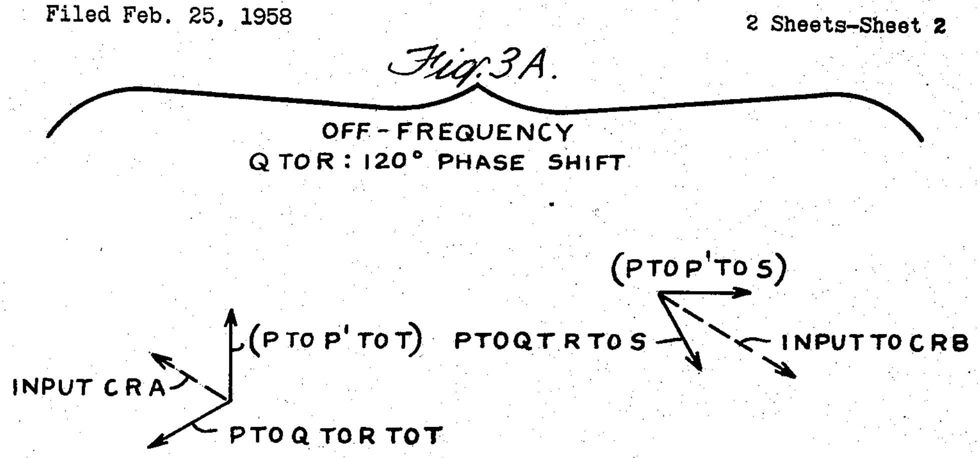
Figs. 3A and 3B are phase diagrams showing the phase of the divided signals on each detector element when frequencies greater and smaller, respectively, than the standard frequency are used.

Fig. 3A shows the phase diagram for off standard frequency conditions. Where the frequency is such that the phase shift from Q to R is more than 90°, the signal appearing at point T will be more than 90° in advance of the phase of the signal appearing at the same point which did not travel through the hybrid coupler 6. For this same frequency, one signal appearing at point S will be identical in phase to the input signal to the device while the other signal which has been phase shifted in each of the hybrid couplers 1 and 9 as a result of its cross-over from one line to the other in each of the couplers and also undergoes the same phase shift in the hybrid coupler 6 as its corresponding signal appearing at point T which was more than 90°. As shown in Fig. 3A, this more than 90° phase shift in the hybrid coupler 6 was assumed to be a phase shift of 120°.

Figure 3B:
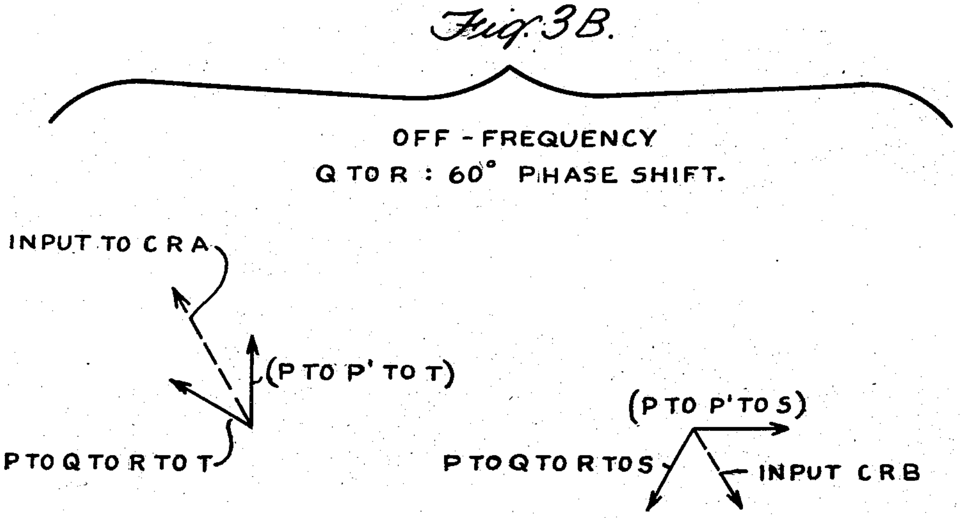

As shown in Fig. 3B, the off frequency may be such as to incur less than a 90° phase shift in the hybrid coupler 6. In such a case, one signal appearing at point T to be picked up by the crystal CRA will be shifted in phase less than the 180° which the corresponding signal for the standard frequency undergoes and the other signal at point T will receive a phase shift of merely 90° as in the previous cases. One of the signals at point S which comes from point R will receive two 90° phase shifts in the hybrid couplers 1 and 9, respectively, and a further phase shift of, for example, 60° occurring from points Q to R as a result of the travel through the hybrid coupler 6. The vector for this signal in Fig. 3B for the input to crystal CRB is designated P to Q to R to S. The other signal which goes through the device without cross-over or travel through the hybrid coupler 6 is obviously in phase with the input to the device, this latter signal being designated P to P' to S. The resultant signals appearing on the diodes CRA and CRB are shown in broken lines in Figs. 3A and 3B. These signals produce a voltage across the potentiometer 12 and it is seen that their phase and amplitude are a function of their input frequency offset from the standard frequency preselected by the setting of the plungers in the hybrid coupler 6. The device is thereby considered to be useful as a discriminator or detector of its input frequency.

As suggested above, various modifications in the broad band frequency discriminator as described above may be effected by persons skilled in the art without departing from the principle and scope of the invention as defined in the appended claims.

What is claimed is:

1. A wideband microwave discriminator comprising a power dividing and phase shifting unit having two input arms and two output arms, one of said input arms being terminated to absorb reflections, a first wave guide communicating with one of said output arms and a second wave guide being equal in length to said first wave guide and communicating with the other of said output arms, a closed end phase shifting unit centrally attached to said second wave guide and communicating therewith, adjustable plungers being disposed in the closed end unit at its closed end, a pair of oppositely inclined wave reflectors disposed in said second wave guide in vertical alignment with said plungers, a second power dividing and phase shifting unit communicting with said first and second wave guides having two input arms and two output arms, and means disposed in the output arms of said third unit responsive to microwave energy for producing voltages proportionate to the frequency introduced in the discriminator.

2. A wideband microwave discriminator comprising a hybrid coupler having two transmission lines, an input opening in one of said lines, equal length wave guide sections in communication with said hybrid coupler, a second hybrid coupler centrally attached to one of said wave guide sections and communicating therewith, adjustable, wave reflecting plungers disposed in said second coupler, wave reflecting elbow sections disposed in said one of said sections opposed to said plungers in the second coupler, the longitudinal axes of the input opening of the first coupler and the other of said wave guides being colinear, a third hybrid coupler having two transmission lines communicating with said wave guide sections, detector crystals disposed in the output region of said third coupler and an output circuit having a potentiometer connected to said crystals.

References Cited in the file of this patent

UNITED STATES PATENTS

| | | |
|---|---|---|
| 2,609,447 | Graef | Sept. 2, 1952 |
| 2,677,051 | Smith | Apr. 27, 1954 |